3,278,272
RECRYSTALLIZATION OF HYDRAZINE BIS-BORANE

James E. Coleman, Edison Township, Middlesex County, N.J., and Frank C. Gunderloy, Jr., Canoga Park, Calif., assignors to Esso Research and Engineering Company, a corporation of Delaware
No Drawing. Filed Mar. 13, 1962, Ser. No. 180,931
7 Claims. (Cl. 23—295)

This invention relates to recrystallization of hydrazine bis-borane ($BH_3 \cdot NH_2 \cdot NH_2 \cdot BH_3$), particularly in an ester solvent system to produce larger crystals.

Larger crystals are desirable for higher bulk density (weight per unit volume including voids) for variation of particle size in compounding.

In general, the size, shape and uniformity of sizes are factors of importance in storing and compounding.

Hydrazine bis-borane (abbreviated HBB), which has sometimes been termed hydrazine diborane, is a commecially available material. It is of interest for various uses including the use as a high-energy solid propellant component and as a solid monopropellant grain in a rocket motor.

Any method of preparing the HBB for recrystallization may be used. One known method involves reaction of hydrazine, $H_2NNH_2$, with $B_2H_6$ in diethyl ether. A more advanced method involves reaction of a hydrazine salt, e.g. $N_2H_4 \cdot H_2SO_4$, with an alkali borohydride $NaBH_4$, under anhydrous conditions in a cycle ether diluent which dissolves the HBB product.

In most instances, the HBB products obtained have been fine powders with no regular crystal structure. Previous attempts to grow HBB crystals in an ether solvent were of limited seuccess.

Now, in accordance with the present invention, relatively larger, clear, transparent and well-defined HBB crystals have been grown in ester and ester-hydrocarbon solutions under ordinary temperature and pressure conditions in comparison to the use of other solvents.

Esters of organic acids, such as alkyl formates, acetates etc., and inorganic acids, such as alkyl phospates, sulfates, borates, or the like, may be utilized as HBB recrystallization solvents. The preferred esters are alkyl esters of alkanoic acids and these esters, in general, contain from 2 to 9 carbon atoms to have a boiling point in the range of 30° to 200° C.

The usual recrystallization techniques may be used. On a small scale, an Erlenmeyer flask fitted with a gas inlet and gas-vapor mixture outlet may be used. Dry inert gas, e.g. $N_2$, is passed into the flask above the recrystallization solution to remove some of the solvent as vapor for concentrating the solution to approximately saturation point while keeping moisture out of the flask. Crystal growth is started by seeding with HBB crystalline nuclei. The crystals can be separated from mother liquor by filtration, washing with volatile hydrocarbon, vacuum drying, and the like.

Experiments have shown that a wide variety of esters (both of fatty acids and inorganic acids) can be used as the solvents. The preferred esters dissolve the HBB at ordinary temperatures and can be vaporized without difficulty, i.e., have boiling points in the range of about 30° to 200° C. To obtain clear bright HBB solutions, the esters should be dried and redistilled.

Ester-hydrocarbon mixtures have yielded some of the best crystals, inasmuch as the HBB concentration may be reduced in much media, and the consequent lower viscosity minimizes dendritic crystal growth via films on the recrystallization container walls. The most suitable liquid hydrocarbons are of any inert and stable type e.g. alkanes, cycloalkanes, and aromatics of about 5 to 9 carbons per molecule and which have boiling points (under 1 atm. pressure) in the range of 30° to 200° C. The liquid hydrocarbon used as a diluent for the ester may have a higher boiling point and lower vapor pressure than the ester solvent.

In the general procedure of recrystallizing HBB fines, these fines are dissolved in the ester solvent and in a proportion to form a saturated solution. If the fines are added in excess to the solvents, they can be removed for filtration of the solution before starting the recrystallization. If insufficient HBB fines are dissolved to form the saturated solution, some of the solvent can be removed by evaporation until saturation is achieved.

If an inert liquid hydrocarbon diluent is used, e.g. $C_5$–$C_9$ hydrocarbon, such a diluent is admixed in a proportion which does not precipitate the dissolved HBB fines. The diluent is also preferably of a high purity and dry (free of $H_2O$). After the solution of the HBB in the ester solvent with hydrocarbon diluent is formed, the slow recrystallization may be accomplished by maintaining the solution at a temperatue in the range of about 20° to 30° C. while evaporating the ester solvent and the hydrocarbon diluent. Vacuum can be used in the exaporation to aid in the removal of higher boiling solvents and diluents. When the crystals have been grown to the desired extent, they can be separated from residual liquid solution by filtration or centrifuging.

Examples of successful recrystallization are the following:

Example 1

Using trimethyl phosphate (boiling point 139° C.) as solvent, fine HBB was dissolved in a proportion of 0.21 g./10 cc. into this solvent which had been dried and redistilled. The solvent was slowly evaporated over a period of several days under reduced pressure from the solution. The product crystals grown were found to be high purity HBB by infrared spectrum analysis. The solvent was suitable even without hydrocarbon diluent.

Example 2

Approximately 0.5 g. of HBB fines was dissolved in 20 cc. of methyl acetate which had been dried and distilled. After filtering to remove a small quantity of insolubles (impurities), the solution was diluted with 38 cc. of n-hexane (dry). The solvent and diluent were then exaporated at 26° C. by a nitrogen flow rate of 106 cc./min. over a period of several days. 0.29 g. of crystals was recovered. The crystals were in the form of cubes and octahedra of cubic system with edges ranging from 0.1 mm. to 0.2 mm. Infrared spectrum of the crystals showed the material to be HBB.

Example 3

HBB fines were dissolved in dry, distilled ethyl acetate in the proportion of 1 g./30 cc. After filtration, the solution was diluted with a like amount of dry n-nonane. Evaporation at room temperature for 4 days with an $N_2$ flow rate of 206 cc./min. gave a 64% yield of clear, transparent crystals. The crystals had cubic structure with edges of 0.1 to 0.2 mm. Density measured by a helium densitometer was 0.84±0.02 g./cc.

Example 4

HBB fines were dissolved in dry, distilled ethyl acetate in the proportion of 2 g./60 cc. The filtered solution was diluted with 80 cc. of benzene and the solvent evaporated at room temperature with a nitrogen flow rate of 260 cc./min. for 6 days. This produced a mass of agglomerated crystals having individual crystal edges of the order of 0.005 to 0.01 mm. with larger crystals present.

Repeats of the above experiment with flow rates ranging from 93 to 315 cc./min. and benzene/ethyl acetate ratios of 1:1 to 4:3 gave varying yields of crystal sizes ranging up to 2 to 3 mm. on edge.

After growing larger crystals from the HBB fines using an ester solvent as a recrystallization medium, the crystals may be classified according to size and any fine crystals may be subjected to further recrystallization. The larger crystals may be ground and reclassified to obtain a uniform crystal size. The larger crystals are particularly suited for coating with a thin film of material for protection on storage or when compounded. The coating material may be a material which is inert to the HBB and such materials as are useful as fuels, e.g. paraffin waxes, polymethylene polymers, aluminum, etc.

HBB crystals of desired size obtained with the ester solvents have been observed in the form of cubes, octahedrons, and forms intermediate to these characteristic of cubic structure. Density measurements on samples by X-ray diffraction indicated a value of $0.85 \pm 0.01$ g./cc. Bulk density measurements gave values of 0.40 g./cc. for a sample passing through 40 mesh, but retained on 100 mesh, whereas the commercial available material gave a value of 0.21 g./cc. and laboratory purified material gave 0.18 g./cc. Still further improvement may be obtained by proper control of particle shape and size as may be obtained from large scale operation. The particle size of the commercial available material varies over a wide range, but the particles are composed of agglomerates of small crystals with edges less than 0.001 mm.

What is claimed is:

1. A process for the recrystallizing of hydrazine bisborane which comprises forming a saturated solution of fine hydrazine bis-borane crystals in an inert alkyl ester selected from the group consisting of lower alkyl phosphoric acid esters and alkanoic acid esters which contain 2 to 9 carbon atoms per molecule and boil in the range of 30 to 200° C. and recrystallizing said hydrazine bis-borane from said solution.

2. The process defined in claim 1 wherein the solvent is an alkyl ester diluted with an inert hydrocarbon having a boiling point in the range of about 30° to 200° C.

3. The process defined in claim 2 wherein the alkyl ester solvent is dried and redistilled before use as a recrystallization medium.

4. The process defined in claim 2, wherein the alkyl ester solvent is dry distilled ethyl acetate.

5. The process defined in claim 2, wherein the solvent is maintained at about 20° to 30° C. during the recrystallization of the hydrazine bis-borane, while said solvent and an inert liquid hydrocarbon diluent are evaporated slowly from the solution.

6. A process for the recrystallizing of hydrazine bisborane which comprises forming a saturated solution of fine hydrazine bis-borane crystals in methyl acetate mixed with n-heptane and recrystallizing said hydrazine bisborane from said solution.

7. A process for the recrystallizing of hydrazine bisborane which comprises forming a saturated solution of fine hydrazine bis-borane crystals in trimethyl phosphate mixed with n-heptane and recrystallizing said hydrazine bis-borane from said solution.

References Cited by the Examiner

Vogel, A Textbook of Practical Organic Chemistry, Longmans, Green and Co., London, 1948, pp. 122 to 126.

Steindler et al., J. Am. Chem. Soc. vol. 75, 756 (1953).

Goubeau et al., Zeitschrift für Anorganische und Allgemeine Chemie, vol. 310, pp. 123–142 (pp. 125 and 134 particularly relied on), June 1961

OSCAR R. VERTIZ, *Primary Examiner.*

CARL D. QUARFORTH, MAURICE A. BRINDISI,
*Examiners.*

L. A. SEBASTIAN, M. WEISSMAN,
*Assistant Examiners.*